United States Patent [19]

Su

[11] Patent Number: 5,667,459

[45] Date of Patent: Sep. 16, 1997

[54] COMPUTERIZED EXERCISE GAME MACHINE

[76] Inventor: Li-ping Su, 405 Avonwood La., Wayne, Pa. 19087

[21] Appl. No.: 633,276

[22] Filed: Apr. 16, 1996

Related U.S. Application Data

[63] Continuation-in-part of Ser. No. 336,938, Nov. 10, 1994, abandoned.

[51] Int. Cl.$^6$ ..................................... A63B 21/00
[52] U.S. Cl. ..................... 482/4; 482/1; 482/3; 482/7; 482/902
[58] Field of Search .............................. 482/1–9, 54, 57, 482/51, 900–903

[56] References Cited

U.S. PATENT DOCUMENTS

| | | |
|---|---|---|
| Re. 33,662 | 8/1991 | Blair et al. . |
| 3,518,985 | 7/1970 | Quinton . |
| 4,512,567 | 4/1985 | Phillips . |
| 4,542,897 | 9/1985 | Melton et al. . |
| 5,001,632 | 3/1991 | Hall-Tipping . |
| 5,067,710 | 11/1991 | Watterson et al. . |
| 5,089,960 | 2/1992 | Sweeney, Jr. . |
| 5,174,759 | 12/1992 | Preston et al. . |
| 5,205,800 | 4/1993 | Grant . |
| 5,209,710 | 5/1993 | Shimizu et al. . |
| 5,239,463 | 8/1993 | Blair et al. . |
| 5,239,464 | 8/1993 | Blair et al. . |
| 5,240,417 | 8/1993 | Smithson et al. . |
| 5,246,411 | 9/1993 | Rackman et al. . |
| 5,252,859 | 10/1993 | Tagney, Jr. . |
| 5,277,678 | 1/1994 | Friedebach et al. . |
| 5,362,069 | 11/1994 | Hall-Tipping . |

OTHER PUBLICATIONS

Bob Glover & Peter Schuder, "The New Competitive Runner's Handbook," Penguin Group, 375 Hudson Street, New York, New York, 1988.

Kathryn Lance, "Running for Health and Beauty," The Bobbs–Merrill Company, Inc., Indianapolis, New York, 1977.

Gary Yanker & Kathy Burton, "Walking Medicine," McGraw–Hill Publishing Company, 1990.

Exertainment Interactive Fitness System, *Hammacher Schlemmer Catalog*, Late Fall, 1994, p. 3.

Heartbeat Trainer, Nordic Track, p. 26.

*Primary Examiner*—Richard J. Apley
*Assistant Examiner*—Glenn E. Richman
*Attorney, Agent, or Firm*—Michael F. Petock, Esq.

[57] ABSTRACT

A computerized exercise game machine provides continuous and instantaneous feedback to the exerciser or user to maintain the user's exercise goal in real time. The exercise goal is updated by the computer system each time the user uses the exercise game machine. The machine includes a fixed frame and moveable component. A signal is generated in response to the speed of movement of the moveable component. The user or exerciser is prompted to maintain a video object representing the user within a shadow object or domain on the video screen. The shadow object represents the exercise goal, such as running at five miles per hour. Different video objects are utilized for users of different physical fitness levels. A shadow object (domain) or course environment is associated with each different video object. The game machine may also provide feedback to the exercise device to control the speed of movement or resistance to movement, slope, such as raising or lowering a treadmill or curve simulation. The invention further includes the method of stimulating a user to exercise to achieve an exercise goal by providing continuous and instantaneous stimulation to the user to maintain the exercise goal. The user is stimulated by the effort of maintaining a video object corresponding to the user's movement within the exercise goal represented by a shadow object or domain on the video display. Further, the user may be prompted whenever the video object moves outside of the domain.

14 Claims, 5 Drawing Sheets

FIGURE 5

| REF NO | UNIT DESCRIPTION | VALUE FOR ||||| 
|---|---|---|---|---|---|---|
| | | TURTLE | DUCK | RABBIT | DOG | HORSE |
| 15 | WARM UP SPEED (MPH) | 1.5 | 2 | 2 | 2.5 | 3 |
| 16 | COOL DOWN SPEED (MPH) | 1.5 | 2 | 2 | 2 | 2.5 |
| 17 | CURVE SPEED (MPH) | 2 | 2.5 | 2.5 | 3 | 3 |
| 18 | HILL SPEED (MPH) | 2 | 2.5 | 2.5 | 3 | 3 |
| 19 | FAST SPEED (MPH) | 5 | 5.5 | 6 | 6.5 | 7 |
| 20 | THRESHOLD SPEED (MPH) | 5.5 | 6 | 6.5 | 7 | 7.5 |
| 21 | SURGE SPEED (MPH) | 7 | 7.5 | 8 | 8.5 | 9 |
| 22 | WARM UP DURATION (MIN) | 3 | 3.5 | 4 | 4.5 | 5 |
| 23 | COOL DOWN DURATION (MIN) | 3 | 3.5 | 4 | 4.5 | 5 |
| 26 | THRESHOLD DURATION (SEC) | 2 | 3 | 3 | 4 | 5 |
| 30 | MIN HILL INTERVAL (SEC) | 5 | 5 | 5 | 5 | 5 |
| 31 | MAX HILL INTERVAL (SEC) | 15 | 15 | 15 | 15 | 15 |
| 32 | MIN CURVE INTERVAL (SEC) | 10 | 10 | 10 | 10 | 10 |
| 33 | MAX CURVE INTERVAL (SEC) | 30 | 30 | 30 | 30 | 30 |
| 34 | MIN SURGE INTERVAL (SEC) | 3 | 5 | 6 | 8 | 10 |
| 35 | MAX SURGE INTERVAL (SEC) | 15 | 20 | 30 | 40 | 50 |
| 36 | MIN SESSION TIME (MIN) | 15 | 20 | 25 | 30 | 45 |
| 37 | MIN WKLY DISTANCE (MILES) | 6 | 9 | 12 | 20 | 30 |
| 38 | MIN WKS TRAINING (WKS) | 0 | 3 | 6 | 9 | 12 |
| 39 | MIN SESSIONS/WK | 3 | 3 | 4 | 4 | 5 |

COMPUTERIZED EXERCISE GAME MACHINE

CROSS REFERENCE TO RELATED APPLICATION

This is a continuation-in-part application of U.S. application Ser. No. 08/336,938, filed Nov. 10, 1994, by the inventor herein and entitled "COMPUTERIZED EXERCISE GAME MACHINE", now abandoned. The benefits of the filing date of this earlier application, for so much as is common with this application, are hereby claimed. The subject matter of this earlier application is incorporated herein by reference the same as if set forth at length.

FIELD OF THE INVENTION

The present invention relates to a computerized exercise game machine and a method of stimulating a user to achieve an exercise goal. More particularly, the present invention relates to a computerized exercise game machine wherein specific goals may be set and the exerciser is continuously stimulated in real time to achieve realistic goals.

BACKGROUND OF THE INVENTION

Prior art exercise equipment requires repetitive motions that require little or no mental concentration. As a result, exercising using prior art machines can be boring, resulting in the exerciser or user failing to achieve his or her goals.

Although much work has been done in the field of exercise equipment and, particularly aerobic exercise equipment, prior art devices have not produced exercise equipment which continuously and instantaneously stimulates the exerciser to achieve his or her goals in real time. Certain prior art exercise equipment has attempted to pace the exerciser with heart rate and heart rate acceleration. For example, see U.S. Pat. No. 3,518,985—Quinton and, more recent work, as shown in U.S. Pat. Nos. 5,001,632 and 5,362,069, both naming Justin Hall-Tipping as the inventor. However, these patent disclosures are directed to exercise machines which are controlled in response to the heart rate of the exerciser. It is well known that the heart rate of the exerciser significantly lags the physical activity of the exerciser, there is a delay both in accelerating to an increased heart rate during increasing physical activity and in deceleration of the heart rate upon slowing of the physical activity. These are significant delays in real time which would prevent real time pacing.

U.S. Pat. No. 5,246,411—Rackman et al. disclose an exercise machine system wherein noise is mixed with a TV signal if the exercise level drops below a preset level. Rackman et al. are directed to attempts at achieving at instantaneous biofeedback and maintenance of a desired exercise level by a total loss of signal being displayed on a TV receiver. Rackman et al. attempt to "punish" a cyclist by destroying a video image displayed on the a TV screen by injecting noise. Rackman et al. do not disclose a system wherein the user or exerciser is continually paced, nor do they disclose a system wherein the pacing of the user may be updated to continually advance the exerciser both by increasing the level of activity as well as instantaneously maintaining the interest of the user.

SUMMARY OF THE INVENTION

The present invention is directed to an exercise game machine which continuously and instantaneously stimulates the user to exercise to achieve a goal which may be automatically updated. The exercise device comprises a fixed frame and a moveable component. The moveable component is adapted to be moved by a user using the exercise device to exercise. The exercise device may take on various forms including those of cycles, skiers, treadmills, steppers and various other types of commonly utilized exercise equipment. A speed measuring device is provided for sensing the movement of the moveable component of the exercise device.

A microprocessor is provided which receives the output of the speed measuring device. The microprocessor may be a part of a computer, a video game apparatus or any other suitably structured microprocessor which may form a part of or be attached to the exercise device. Means are provided for inputting data relative to the user to the microprocessor. This may include a control pad such as those utilized with video games, a keyboard or any other suitable data input means.

A video display is provided for displaying data generated by the microprocessor. The video display may be any suitable video display including a television or computer monitor, a CRT, a LED display, a LCD display or any other suitable video display.

Memory means is provided for storing a program for the microprocessor and information relative to one or more users. This memory means may be any suitable type of memory means including that contained on a cartridge or a video game type apparatus, a hard drive of a computer, or any other suitable type of memory.

The microprocessor is provided with the means for generating one or more selectable video objects and related video domains and one or more video course environments using data from the memory means. The microprocessor selects one of the video objects and a related one of the video domains as well as a video course environment in response to signals received from the data input means. In selecting the appropriate video object and video domain, the microprocessor will access the memory means to determine the prior data on the particular user. The related video domain may preferably be larger and of a shape corresponding to the shape of the video object. That is, for example, the video domain may be a shaded area in the shape of a turtle where the video object is in the shape of a turtle, but the domain may be somewhat larger than the video object to allow the user some leeway for variation in movement of the moveable component. However, it is understood that the video domain may be of any suitable shape, not necessarily corresponding to the shape of the video object, and may be merely a square, rectangular or round shape. The video domain may be related to the video object merely in the sense that a selected video object will result in a related video domain having a corresponding speed.

The microprocessor generates a video course environment (background scenery) and the selected domain for display on video display. The microprocessor also generates a selected video object corresponding to the video domain and positions the video object on the video display relative to the video domain in response to the output of the speed measuring device whereby the user is stimulated to try to maintain the video object within the video domain on the video display by increasing or decreasing the amount of movement of the moveable component of the exercise device.

Although a preferred embodiment would utilize a different video object for different levels of physical fitness of the user, such as a turtle, duck, rabbit, dog, horse or the like, it is understood that differing video course environments may be utilized to represent different levels of physical fitness. In other words, independent of the level of physical fitness, the user could be represented on the video display as a runner or cyclist, and the video course environment could be different depending upon the user's physical fitness level. For example, a beginner starting a physical fitness program could be represented as a runner on a West Coast beach, and a more advanced or more physically fit user could be represented as a runner on a running track on the East Coast. Of course, numerous specific variations are possible in choosing the series of video objects or the series video course environments.

The present invention further includes a method of stimulating an exerciser or user to continuously exercise within the parameters of a specific exercise program by varying a course environment and/or a domain and encouraging a user to maintain a video object within the domain on a video display by controlling the amount of movement of a moveable component of an exercise device.

The present invention is not limited to the preferred embodiment illustrated and described, but such specifics are provided for the purposes of illustrating a presently preferred embodiment.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 5 is a table of illustrative values utilized in the circuitry of the present invention when various selected video objects are utilized in accordance with one embodiment of the present invention.

DETAILED DESCRIPTION OF THE PREFERRED EMBODIMENTS

Figure 1:
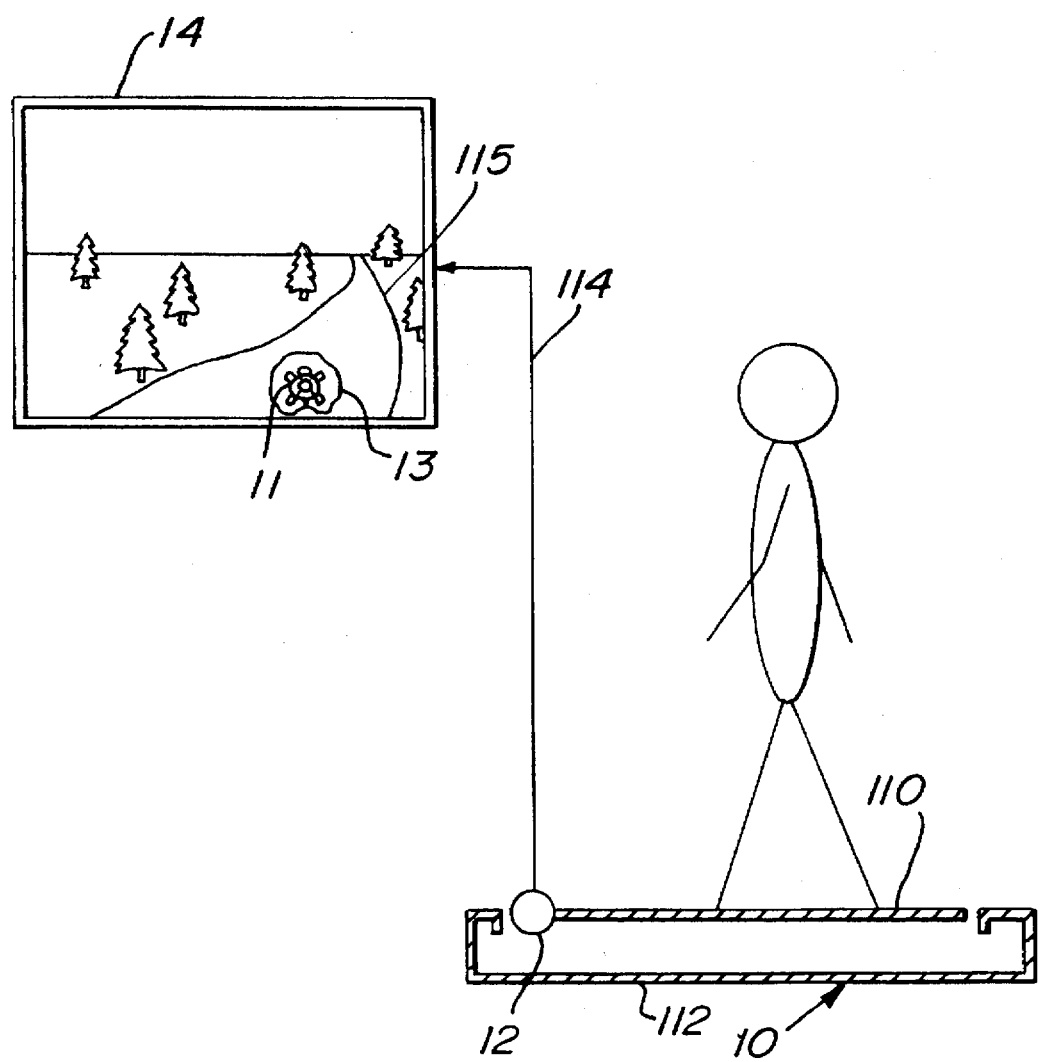
FIG. 1 is a schematic view of a computerized exercise game machine in accordance with the present invention.

Referring now to the drawings, wherein like numerals indicate like elements, there is shown in FIG. 1 a schematic diagram of a computerized exercise game machine in accordance with the present invention which includes an exercise device 10. The exercise device 10 may be any suitable type of exercise device having a fixed frame 112 and a moveable component 110.

The exercise device 10 may be any suitable type of exercise machine including a treadmill, a cross country ski machine, a cycle, a stepper or any other type of exercise machine which has a frame and a moveable component which is moved by the user or exerciser.

The exercise device 10 is provided with a speed measuring device 12. Speed measuring device 12 may be any suitable type of speed measuring device including a hall sensor or any other suitable speed measuring device which generates a signal in response to and representative of movement of the moveable component 110 which may be processed by a computer or microprocessor. Various types of magnetic speed measuring devices and other speed measuring devices which are commercially available, may be used.

The output of speed measuring device 12 is fed to the computer video system 14 via cable 114. Computer video system 14 generates a selected changeable course environment 115 in which a domain or shadow object 13 appears to move through the course environment 115. The user, exercising by moving moveable component 110 of exercise device 10, tries to keep video object 11 within domain or shadow object 13. Video object 11 may be any suitable shape. As presently preferred herein, video object 11 may be a turtle for a beginner, a duck for an intermediate user with minimal training, a rabbit for an advanced user who is in shape (physically fit), a dog may be used to represent an amateur athlete and a horse may be utilized to represent a user having physical conditioning substantially equivalent to that of a professional athlete. However, it is understood that various other video objects may be utilized to represent the different levels of physical training and activity. In a presently working prototype embodiment, a cycle with a rider may be utilized as a video object in which the user or exerciser tries to maintain the man on the cycle within a rectangular, shaded area of the road representing the domain 13.

The different video representations corresponding to a differing degree of physical fitness may reside in different course environments. In other words, the user, may still have to maintain the video object 11 within the shadow object or domain 13 by constantly moving the moveable component 110 of the exercise device 10 at the appropriate speed, with differing course environments 115 representing differing levels of physical fitness. For example, a scene on a beach on the West Coast may represent a beginner and various other scenes moving towards the East Coast may represent increasing levels of physical fitness. Numerous other variations of this theme are possible. Nevertheless, it is within the spirit of the present invention that the video object or the course environment could be utilized to represent differing levels within the exercise and fitness scheme, such as beginner, intermediate user with minimal training, advanced user who is physically fit, an amateur athlete, professional athlete and the like. Additionally, it is understood that other categories of users may be denominated by the video object or course environment, and the present invention is not limited to the specific categories of users given herein as examples.

Figure 2:
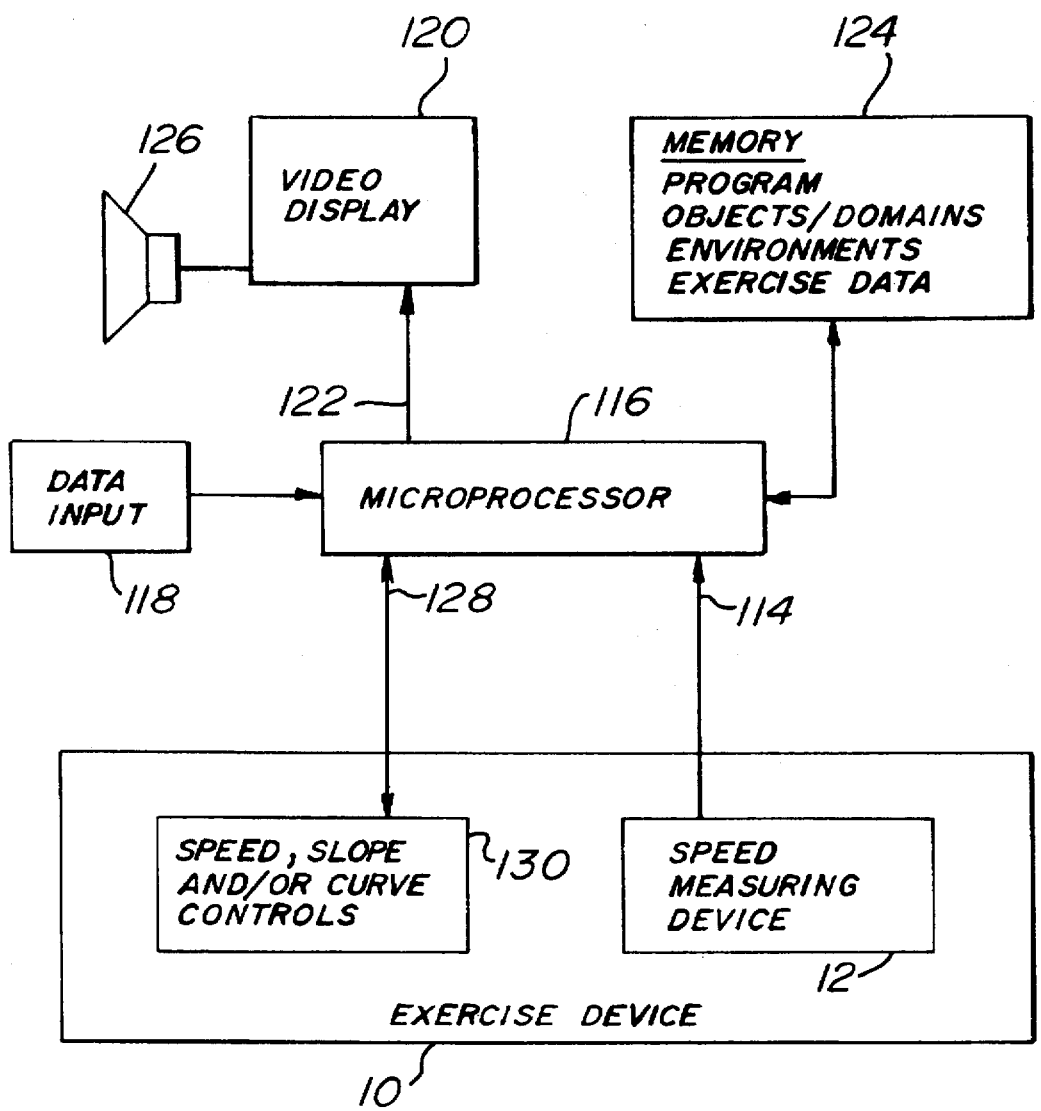
FIG. 2 is a block diagram of the electronic circuitry of the computerized exercise game machine of the present invention.

Referring now to FIG. 2, there is shown a schematic block diagram of a computerized exercise game machine in accordance with the present invention. There is shown in FIG. 2 an exercise device 10 with the speed measuring device 12 which measures the speed of the moveable component 110 of FIG. 1. The output of the speed measuring device is supplied via line or cable 114 to microprocessor 116. Microprocessor 116 receives data input from data input 118. Data input 118 may be any suitable means for supplying data input to microprocessor 116 such as a control pad of a video game, a joy stick, a keyboard or any other suitable data input means. Data input 118 may be utilized to provide various types of data to the microprocessor 116 such as user identification, user age, weight, height and sex. For example, where data input 118 is a controller of the type utilized with video games, microprocessor may be stepped through a series of ages and the appropriate age of the user selected. This is done in conjunction with video display 120 which is supplied with video input controls via line 122.

The microprocessor 116 operates in conjunction with memory 124. Memory 124 may be any suitable type of memory which may include read only memory, read/write memory and random access memory. Various well known means for providing this memory be utilized. For example, where the computerized exercise game apparatus of the present invention is in the form of a video game apparatus utilized in conjunction with a television-type video display, memory for storing the program, the video objects and domains and exercise data may be stored on a cartridge of the type utilized in video games. Where the present invention is utilized in conjunction with a computer utilizing a hard drive, this memory may be provided by the hard drive memory of the computer. Random access memory for the microprocessor may be included within the microprocessor 116 or within memory 124.

Video display 120 may be any suitable type of video display for displaying video objects, video domains, video course environments (background scenery) and exercise data during the initial set up and at various other appropriate times, such as at the conclusion of an exercise session. The video display may be a CRT, LCD, LED or television.

A speaker 126 may be provided in conjunction with the computerized exercise game machine. Speaker 126 may be utilized for various functions including the providing of a whistle at the beginning of an exercise session in the form of a race, audio alarm signals when the user is going too fast or too slow and music and other sound during the exercise session.

Microprocessor 116 may be adapted, in accordance with the program, to control the controls on exercise device 10, such as speed or resistance to movement of the moveable component 110 on an exercise device such as a cycle, or may control the slope or upward (raising) or downward (lowering) movement of a platform of an exercise device such as a treadmill or may simulate curves, such as by leaning or slanting an exercise device such as a cycle. The control signals from microprocessor 116 are fed via bidirectional lines 128 to suitable speed or resistance, slope and/or curve controls 130 on the exercise device. Signals from controls 130 would also be fed back to the microprocessor to enable the microprocessor 116 to be apprised of the current position or setting of controls 130. For example, if the slope control were in its upper most position, this data would be fed to microprocessor 128 via the bi-directional lines 128. Of course, variations are possible depending upon the exact type of exercise device and the controls 130 which are utilized therein.

In any event, the computerized exercise game machine of the present invention may provide a dynamic experience wherein the course environment displayed on video display 120 is reflected in the actual exercise device. For example, if the course environment displayed on video display 120 indicates that the user is running uphill, the platform on a treadmill may be raised to reflect a runner running uphill. Similarly, if the exercise device is a cycle and the course environment displayed on video display 120 indicates that the cyclist is going uphill, the resistance to peddling may be increased, effectively decreasing the speed.

Figure 3:
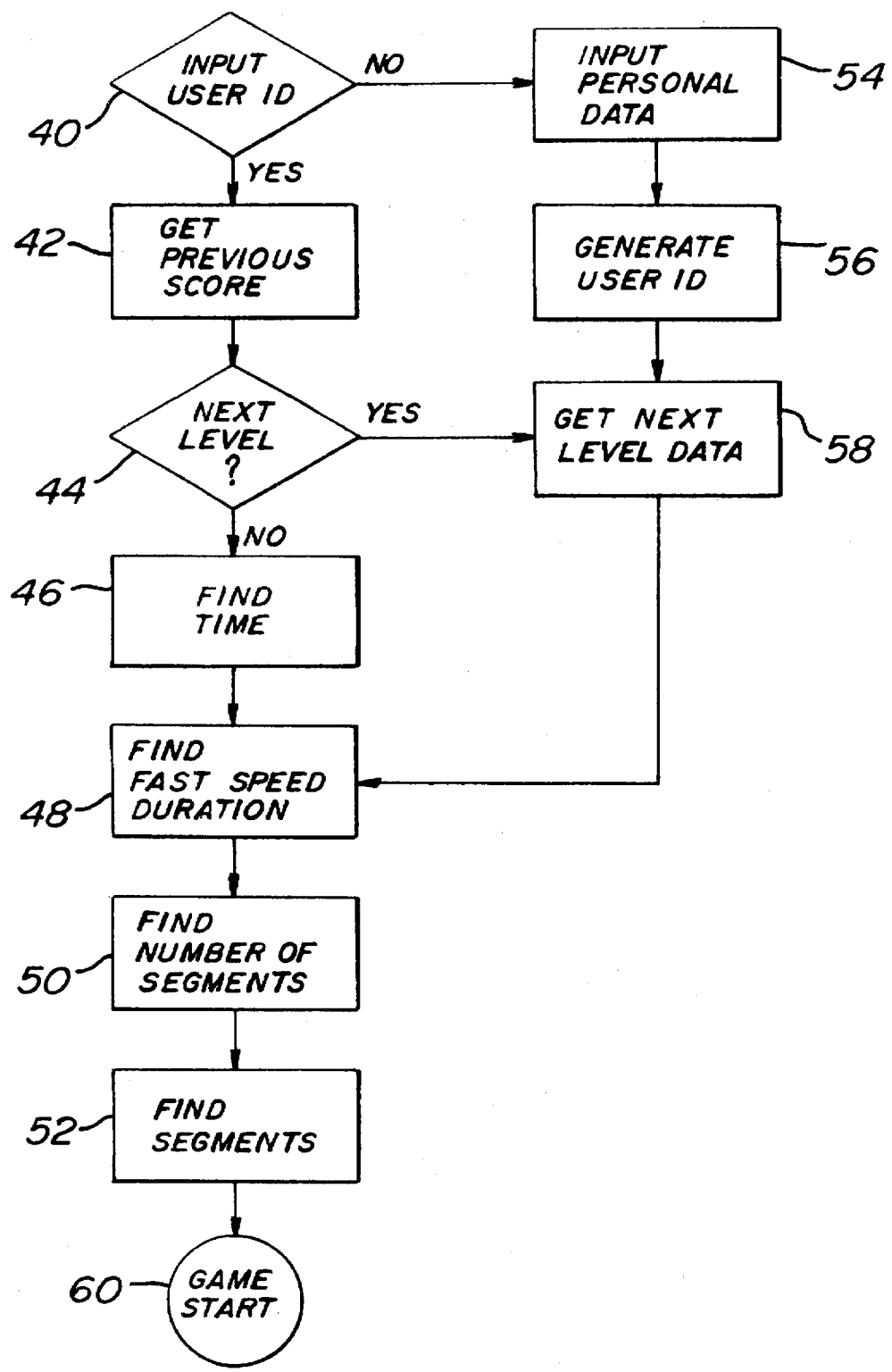
FIGS. 3 and 4 are flow charts of the logic of the circuitry or program of the present invention.
Figure 4:
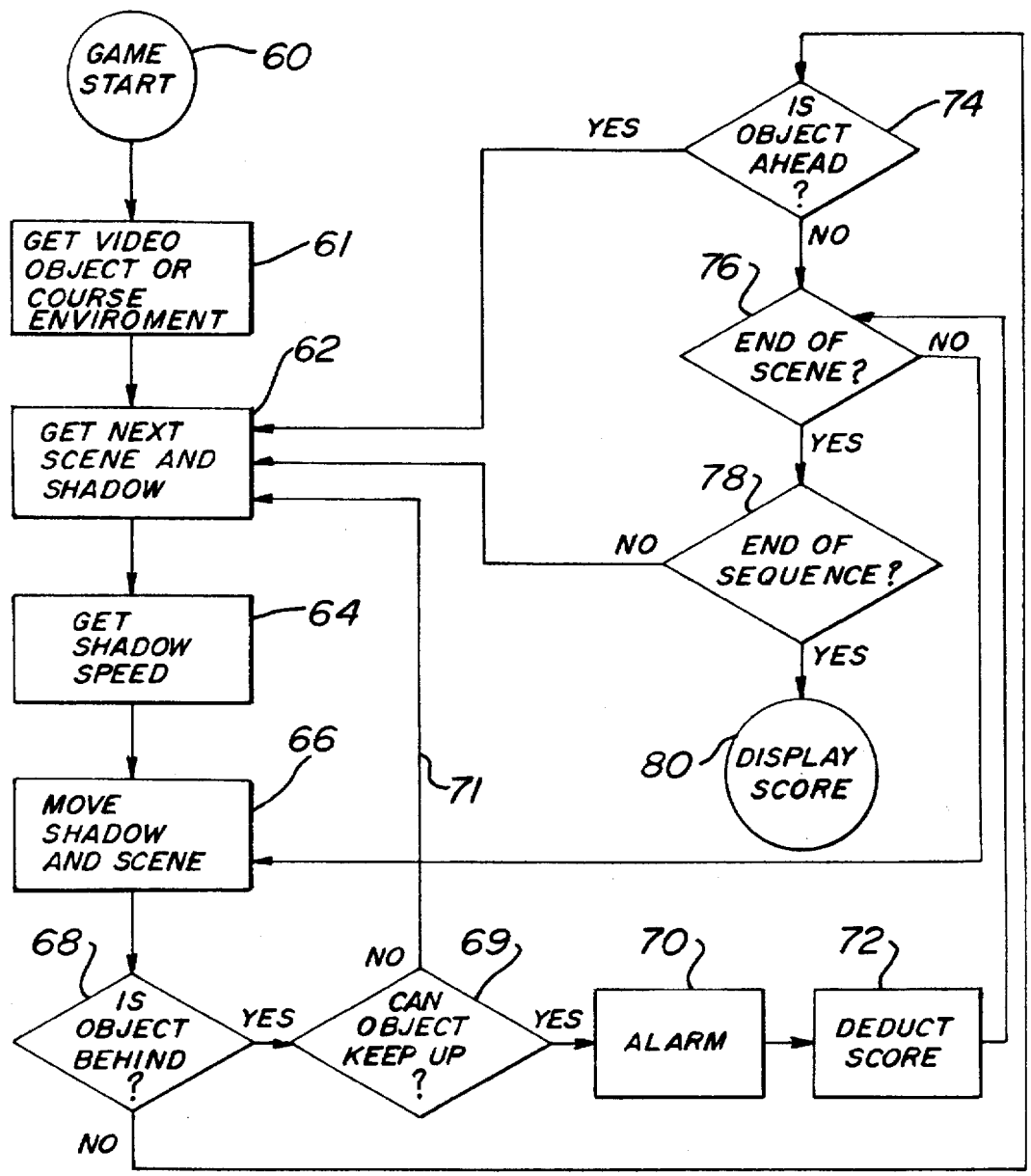

FIGS. 3 and 4 are flow chart diagrams showing the operation of the exercise game apparatus in accordance with the present invention. FIG. 3 is a flow chart diagram showing initialization of the game system prior to the start of the game, including identification of the user, obtaining of the user's previous exercise level and updating of the exercise levels to select an appropriate exercise goal. FIG. 4 is flow chart directed to the control of the video display and audio output during the exercise session. The flow chart diagrams of FIGS. 3 and 4 will be best understood by reference to operating unit values for various exercise levels as illustrated on FIG. 5. However, it is understood that FIG. 5, the values therein and even the representations of a turtle, duck, rabbit, dog and horse are merely illustrative of a presently preferred example, and other video objects may be utilized to represent various exercise levels and various other operating units and values may be utilized.

As described above, the present invention provides an apparatus and method of stimulating a user to exercise to achieve a specific exercise goal. The exercise goal is selected from different categories which may be represented by different video objects or different course environments on the video display. The exercise goal is updated as a result of the user's previous performance. This updating is in accordance with specific requirements, an example of one such set of criteria is provided in FIG. 5.

Once the user is identified, either as a previous user or new data is generated to identify the user, the user's previous exercise data, if any, is obtained and updated to generate an exercise goal having a selected number of segments and a selected sequence.

Once this has been accomplished, in accordance with the flow chart diagram of FIG. 4, the exercise session is begun with the user being continuously prompted by an interesting game to maintain his or her exercise level of activity closely within the exercise goal by seeking to maintain a video object, representing the user, within a shadow area or domain 13 on the video display. When the user deviates from his or her goal by moving the moveable component 110 of the exercise device 10 at a higher or lower rate than the exercise goal, the goal being represented by the video domain, an alarm, either audio or visual or both, is generated. As the user continues to operate the system over a number of exercise sessions, he or she advances from one category of video object, with its associated exercise goal values, to the next video object. For example, in the example illustrated herein, the user would progress from a turtle to a duck to a rabbit and so on, corresponding to the user's increasing physical fitness as demonstrated by his or her recorded exercise history over a number of weeks, an example of the number of weeks of training to advance from one video object to another being illustrated at 38 on FIG. 5.

Before proceeding with a detailed description of the flow chart diagrams of FIGS. 3 and 4, the following may be noted with respect to the examples of values given in the table of FIG. 5. Warm up speed 15 is a fixed constant within each level. It is used at the start of the exercise to prevent sports injuries and is not a demanding speed. All speed values in the table of FIG. 5 are given in miles per hour. The warmup duration 22 is fixed within each level and is a continuous uninterrupted activity. The warm up is mandatory regardless of class, that is whether a user is a novice represented by a turtle video object or at a professional level represented by a horse video object. During the warm up period, the shadow object or domain moves with a fixed rhythm and music may be provided. However, the user is required to maintain the video object 11 within the domain 13 during this period, the same as during the remainder of the exercise session.

The cool down speed 16 is a fixed constant within each physical fitness level and is used at the end of each session. This is not a demanding speed. During this period of time, the rhythm of movement of the shadow object or domain 13 is slower and soothing music may be provided via speaker 126. The cool down duration 23 is fixed within each level and is a continuous uninterrupted activity. A cool down period is mandatory regardless of the aerobic level (video object selected).

The curve speed 17 is a slightly variable speed which enhances the user's attention. Additionally, the shape and size of the shadow object or domain 13 may change to increase the interest level and concentration of the user. There may be several curve intervals during a session.

The hill speed 18 may also be programmed with requirements for extra attention by the user. The shadow object or domain 13 may deform or decrease in size to require the user to slow down and maintain the video object 11 within the confines of shadow object 13. There may be several hill intervals specified by the minimum hill interval 30 and the maximum hill interval 31.

The fast speed 19 is a fixed race speed and it is a constant in each level. A race may be initiated by the shadow object or domain 13 automatically, that is by the program or circuitry. Alternatively, although not a presently preferred embodiment, it may be started when the user controlled the video object 11 gets ahead of shadow object or domain 13 for a significant amount of time. When a race occurs, the shadow object or domain 13 converts to the fast speed. The fast speed duration is fixed within each level and is a continuous uninterrupted activity. A race is completed either at the end of the program time period or by a user slowing down, showing that he or she cannot keep up with the shadow object or domain 13.

The threshold speed 20 always follows the race while the user must try his or her best to finish the race. The threshold duration 26 is a fixed time within each level and is a continuous uninterrupted activity. Various interest maintaining video scenes may be generated to maintain the interest of the user, such as the shadow object 13 jumping onto a moving train at the end of the race causing the speed to go a notch faster than the fast speed 19.

The surge speed 21 is an acceleration period to maintain interest in the user, various environmental objects may be generated such as the presence of a tiger or falling rocks. This will naturally encourage the user to exert extra effort to increase the user's speed. There may be several surge intervals to comprise a total surge time, but each surge interval is a continuous uninterrupted activity. There may be several surge intervals during each session while each level has a different surge speed 21. The user must start from a stop and reach that speed in the shortest possible time. As discussed above, the circuitry or program of the flow chart diagram of FIG. 3, taken in conjunction with the values in FIG. 5, such as the minimum weekly distance, the minimum weeks of training and the minimum sessions per week, causes the user's goals to progress from a novice or turtle, to an intermediate or duck, to an advanced or rabbit, to an amateur or dog, and to a professional or horse. Each level increase demands a faster speed, a longer duration and the user must meet the requirements as set forth in the chart of FIG. 5, such as the minimum weeks of training 38, minimum distance per week 37 and the minimum sessions per week 39. A special course environment is generated for each session which has equal or more aerobic exercise than the previous session. The increase in aerobic exercise is done by expanding the duration of the surge (acceleration), curve and hill speeds.

Referring now more particularly to FIG. 3, each session starts with inputting of the user identification (ID), shown at 40 at FIG. 3. This identification enables the computer to access the memory and obtain the user's previous records, if any, in block 42.

If the user does not have a previous identification (ID), he or she must input the user's personal data at block 54, such as name, age, height, sex and weight in order for the computer to generate a user personal exercise file and generate a user ID in block 56. This will automatically establish a new user as a novice or turtle.

In step 58, the next level data is obtained from memory in order to create the controls for a new exercise session period. Each session is an exercise session with the creation of new exercise goals where the user will be starting with a higher speed and longer session duration, and a new minimum curve, hill, and surge intervals, assuming successful completion of the previous goals as reflected by data stored in memory. The fast speed duration is calculated in step or block 48 by taking the minimum session duration 36 and subtracting from that the sum of the warm up duration 22, the cool down duration 23, the minimum hill interval 31, the minimum curve interval 32, the minimum surge interval 34 and the threshold duration 26.

In the specific preferred embodiment illustrated, the step of finding the sequence 52 may be formulated from the warm up speed 15, a first random activity, second random activity, third random activity, a fourth random activity and a cool down speed 16. Fast speed duration 19 is always followed by a threshold duration 26 and, therefore, they may be considered as one activity when generating a sequence.

Before generating a new exercise goal for a new exercise session, the system will check for a user's previous records and determine if the user is qualified for the next level as shown in step 44 of FIG. 3. If so, the new session will be generated by the steps outlined above. If not, the microprocessor will find a time in step 46, which is equal to the surge time 29, the curve time 28, and the hill time 27 substantially as follows:

surge time=old surge time+minimum surge interval 34;

hill time=old hill time+minimum hill interval 30;

curve time=old curve time+minimum curve interval 32.

In other words, the microprocessor, utilizing memory, will take the user's previous exercise data and update it by certain minimum increments to create a new exercise goal.

The fast speed duration can be determined as follows:

fast speed duration=minimum session duration 36−(warm up duration 22+cool down duration 23+minimum hill interval 30+plus minimum curve interval 32+minimum surge interval 34+threshold duration 26).

The following may be utilized to find the number of segments:

a) find maximum surge segments equal new surge time divided by the minimum surge interval 34;

b) select a random number between 1 and the maximum number of surge segments and make it a number of surge segments; and c) the first surge interval is always equal to the minimum surge interval 34 and the second surge interval always equals 2 minimum surge intervals 34 with the balance of the surge time being divided equally, with each inter-val being greater than the minimum surge interval 34.

The hill and curve segments are based on the same formula. The sequence may be determined as follows:

when there is more than one segment for a given activity, each segment is considered an independent activity and, sequence=warm up speed 15+first random activity+second random activity+third random activity+fourth random activity+cool down speed 16.

After the completion of the determination of the new exercise goals for this exercise session of this particular user, utilizing the flow chart shown in FIG. 3, microprocessor 116 generates a game start signal in step 60. This game start signal 60 initiates the beginning of the actual exercise sessions and the steps of the operation of the computerized exercise game machine are shown in FIG. 4.

Referring now to FIG. 4, once a game start signal is received as shown at 60, the microprocessor accesses an appropriate video object, for example, a turtle in the case of a novice, at step 61. The microprocessor also accesses the next scene or course environment and shadow object or domain at step 62. After obtaining a proper speed for shadow object or domain 13 at step 64, the microprocessor may move one frame of shadow object or domain 13 and course environment scene 115 at step or block 66.

As referred to above regarding an alternate embodiment wherein the user's physical fitness level would be represented by a different course environment rather than a different video object, step 61 would be a step in which an appropriate course environment is accessed, such as a beginner running on a beach on the West Coast. This alternate embodiment may be kept in mind and appropriate modification made where a particular course environment is selected to represent a different fitness level as contrasted to a different video object. However, for the purposes of description of a specific embodiment herein, without limiting the scope of the invention, it is assumed that a particular fitness level is represented by a particular video object, such as a turtle for a beginner having minimal physical conditioning.

The microprocessor 116 then checks if the selected video object 11 is behind domain 13 at step 68. If the video object is behind, the microprocessor calculates or determines if video object 11 can keep up with domain 13 at step 69. This is determined by a determination of whether video object 11 has been behind domain 13 for a significant amount of time. If so, the microprocessor 116 via line 71 goes to the next scene and shadow object from block 62, which in this case will be a scene and shadow object with a cool down speed 16. If the video object 11 is behind the domain 13 for just a few frames and the microprocessor determines that the video object 11 (the user moving the moveable component of the exercise device 10) is able to keep up with the shadow object or domain speed, the computer should send an alarm as indicated by block 70 in the form of either sound and/or images and deduct a point as shown in block 72 from the potential score.

If at step 68 it is determined that the video object 11 is not behind the domain 13, the microprocessor checks if the video object is ahead of the domain for a significant amount of time at step 74. If true, the computer goes to the next scene and shadow as the result of a yes output from step 74 to block 62 wherein the next scene is the fast speed 19 and the start of a race.

If the video object 11 is neither behind nor ahead of the shadow object or domain 13, the microprocessor checks to see whether it is the end of a scene for current activity at step 76 as a result of a negative output from decision step 74. If it is not the end of a scene, the microprocessor controls the movement of another frame of shadow object and scene in block 66 as the result of a negative output of decision step 76.

If it is the end of current activity, the microprocessor checks if it is the end of the sequence at decision step 78. If not true, the microprocessor goes back to get the next scene and shadow object in block 62 as a result of the negative output decision of decision step 78.

At the end of all sequences, which means that all activities have been completed, the computer will display a score as shown on the flow chart of FIG. 4 at 80.

In accordance with the method and apparatus of the present invention, the user is asked for the user's identification code each the user turns on the machine. A first time user will be asked to enter age, weight, height and sex. The microprocessor will generate an identification code for future sessions. A course environment will be generated by the microprocessor, using memory for each session which has an equal or greater amount of aerobic time than the previous session.

Each session starts at a slow comfortable speed with music and scenery and the user is requested to stay within the shadow object or domain 13. Otherwise, a warning or prompt signal, in the form of video and/or sound will be produced.

As the game progresses, different course environments and situations may appear at random, and the shape and size of the shadow object or domain 13 may change accordingly. The user is requested to stay within the shadow 13, and a warning signal will be generated when the video object 11 appears outside of domain 13 as a result of the user moving the moveable component 110 too slow or too fast.

If at any time during the session, the user cannot maintain the video object 11 within the shadow object or domain 13 by moving the moveable component of the exercise device at an appropriate speed for a significant amount of time, the exercise game apparatus of the present invention will exit the user to a cool down mode. On the other hand, if the user maintains a speed faster than the shadow object or domain 13 for a significant amount of time, the user, in one embodiment, may be forced into a race to try to keep the video object 11 within the shadow object or domain 13.

Each game may be ended by completing the exercise goal as generated by the game apparatus of the present invention or the user not being able to keep up with the shadow object or domain 13. At the end of the exercise game, the user will be directed to a cool down mode wherein the shadow object or domain 13 again will correspond to a slow and comfortable speed with music and scenery. Depending on the extra amount of aerobic exercise of each session, there is a potential maximum score and the user will earn a percentage of this score depending upon the amount of time the user stays within the shadow. After each exercise game, there will be displayed on the video display, the user's score, his or her records and the user's goal for the next session.

In accordance with the method of the present invention, the user is stimulated to continuously and instantaneously maintain compliance with an exercise goal, the goal being automatically updated for each exercise session by small increments. In this manner, the user may continually improve his or her physical fitness by being continuously urged and prompted into compliance with the goal.

The user exercises by moving a moveable component of an exercise device, such as a cycle, treadmill, ski machine or the like. Movement of the moveable component is sensed and an output is provided indicative thereof. A video display is provided in which the domain displayed on the video display is representative of an exercise goal to be achieved. Also displayed on the video display is a video object corresponding to movement of the moveable component by the user. The relative position of the video object and the domain is controlled on the video display in response to the user's movement of the moveable component. An alarm or prompt to the user is generated instantaneously if the user moves the moveable component too slow or too fast resulting in the video object falling outside the domain on the video display. In this manner, the user is instantaneously prompted and encouraged by the video display to maintain the exercise goal.

At the end of each exercise session or the beginning of the next exercise session, the data of the user is stored in memory and incrementally updated or increased to create a new exercise goal for the next exercise session.

In accordance with the invention herein, the exercise game system of the present invention may be utilized by a plurality of users wherein each user is independently assigned a video object and an exercise goal depending upon his or her current physical condition or stage as reflected by the initial records and the updated records of his or her exercise program, which are incrementally advanced from one exercise session to the next.

It will be understood by those skilled in the art that many variations may be made within the scope of the present invention, in addition to those referred to above. It is further pointed out that the computerized exercise game machine of the present invention may be adapted to existing exercise equipment by adding a speed measuring device to the existing exercise devices. The microprocessor of the present invention may be a part of a computer video system, a video game or any other suitable microprocessor. As described above, variation in shape and size of both the video object and the shadow object may be used extensively to increase the intensity level for the user. Other animals or symbols may be used in the process. A loud noise may be introduced when the video object representing the user falls outside of the shadow object during a curve or the like. If the user gets ahead of the shadow for an extended period of time during a race, the whole screen may go blank so that the user may run as fast as he or she can with an automatic level advancement if the user finishes the race with a score of at least 1 mile per hour higher than the target speed.

The, present invention may be embodied in other specific forms without departing from the spirit or essential attributes thereof and, accordingly, reference should be made to the appended claims, rather than to the foregoing specification as indicating the scope of the invention.

I claim:

1. An exercise game machine, comprising:
   means for generating an output signal indicative of the movement of a moveable component of an exercise device;
   means for generating on a video display a course environment and a domain within said course environment which represent a varying exercise goal;
   means for generating a video object on said video display and for controlling the position of said video object relative to said domain responsive to said output signal;
   means responsive to the relative positions of said video object and said domain such that a prompt signal is provided to a user to prompt the user to adjust the speed of movement of the moveable components whenever the video object is displayed outside of said domain; whereby said user is stimulated to try to maintain said video object within said domain on said video display by increasing or decreasing the amount of movement of said moveable component.

2. An exercise game machine in accordance with claim 1 wherein said prompt signal is in the form of a message displayed on said video display.

3. An exercise game machine in accordance with claim 1 wherein said prompt signal is a prompt object displayed on the video display.

4. An exercise game machine in accordance with claim 1 wherein said prompt signal is an audio signal.

5. An exercise game machine, comprising:
   an exercise device comprising a fixed frame and a moveable component, said moveable component adapted to be moved by a user using the exercise device to exercise;
   a speed measuring device for sensing the movement of said moveable component;
   a microprocessor, said microprocessor receiving the output of said speed measuring device;
   means for inputting data relative to the user to said microprocessor;
   a video display for displaying data generated by said microprocessor;
   memory means for storing a program for said microprocessor and information relative to one or more users;
   said microprocessor including means for generating one or more selectable video objects and related video domains and one or more video course environments using data from said memory means;
   said microprocessor selecting one of said video objects and a related one of said video domains as well as a video course environment in response to signals received from said data input means;
   said microprocessor generating a video course environment and said selected domain for display on said video display;
   said microprocessor generating a selected video object corresponding to said video domain and positioning said video object on said video display relative to said video domain in response to the output of said speed measuring device;
   whereby said user is stimulated to try to maintain said video object within said video domain on said video display by increasing or decreasing the amount of movement of said moveable component.

6. An exercise game machine in accordance with claim 5 wherein said generating means is adapted to selectively produce a plurality of selectable video objects and related video domains corresponding to a variety of levels of physical fitness of the user.

7. An exercise game machine in accordance with claim 6 wherein a first selectable video object and related domain is a turtle which represents the lowest level of physical fitness and where another video object and related video domain is a horse representing the highest level of physical fitness of the user.

8. An exercise game machine in accordance with claim 5 wherein said generating means is adapted to selectively produce a plurality of selectable video course environments corresponding to a variety of levels of physical fitness of the user.

9. An exercise game machine in accordance with claim 5 wherein said exercise device includes means for modifying resistance to movement of said moveable component in response to a signal from said microprocessor corresponding to a video course environment of said generating means of said microprocessor.

10. An exercise machine in accordance with claim 5 wherein said exercise device includes means for changing the effective slope of the exercise device, said means for changing the effective slope of the exercise device being adjustable in response to a signal from said generating means of said microprocessor generating a course environment.

11. An exercise machine in accordance with claim 5 wherein said exercise device includes means for simulating curves in a course, said means for simulating curves in a course being adjustable in response to a signal from said generating means of said microprocessor generating a course environment.

12. An exercise machine in accordance with claim 5 including means in said microprocessor for adjusting the size of said selected domain on said video display at least in part in response to a signal from said speed measuring device.

13. A method of stimulating a user to exercise to achieve an exercise goal, comprising the steps of:

providing an exercise device with a moveable component moveable by the user to perform an exercise;

sensing the movement of the moveable component and providing an output signal indicative thereof;

providing a video display of a domain representative of an exercise goal to be achieved;

controlling in response to said output signal the relative position of a video object representing movement of the moveable component as moved by the user with respect to the domain;

whereby the user is instantaneously encouraged by the video display to maintain said video object within said domain to achieve exercise goal.

14. A method in accordance with claim 13 including the step of recording results of an exercise session of a user in a memory and incrementally updating the stored results to create a new exercise goal in a subsequent session.

* * * * *